(12) United States Patent
Chen et al.

(10) Patent No.: US 11,949,073 B2
(45) Date of Patent: Apr. 2, 2024

(54) NONAQUEOUS ELECTROLYTIC SOLUTION, LITHIUM-ION BATTERY, BATTERY MODULE, BATTERY PACK, AND APPARATUS

(71) Applicant: CONTEMPORARY AMPEREX TECHNOLOGY CO., LIMITED, Ningde (CN)

(72) Inventors: Peipei Chen, Ningde (CN); Chenghua Fu, Ningde (CN); Junmin Feng, Ningde (CN); Chengdu Liang, Ningde (CN)

(73) Assignee: CONTEMPORATY AMPEREX TECHNOLOGY CO., LIMITED, Ningde (CN)

(*) Notice: Subject to any disclaimer, the term of this patent is extended or adjusted under 35 U.S.C. 154(b) by 712 days.

(21) Appl. No.: 17/132,591

(22) Filed: Dec. 23, 2020

(65) Prior Publication Data

US 2021/0119262 A1 Apr. 22, 2021

Related U.S. Application Data

(63) Continuation of application No. PCT/CN2019/108605, filed on Sep. 27, 2019.

(30) Foreign Application Priority Data

Sep. 28, 2018 (CN) .......................... 201811140362.5

(51) Int. Cl.
*H01M 10/00* (2006.01)
*H01M 4/485* (2010.01)
(Continued)

(52) U.S. Cl.
CPC ....... *H01M 10/0569* (2013.01); *H01M 4/485* (2013.01); *H01M 4/505* (2013.01);
(Continued)

(58) Field of Classification Search
CPC ......... H01M 10/0568; H01M 10/0567; H01M 4/382; H01M 10/0525; H01M 10/052; H01M 2300/0037; H01M 2300/0034
See application file for complete search history.

(56) References Cited

U.S. PATENT DOCUMENTS

| | | |
|---|---|---|
| 2014/0017559 A1 | 1/2014 | Kawasaki et al. |
| 2018/0108937 A1* | 4/2018 | Drach ............... H01M 10/0569 |
| 2020/0044285 A1* | 2/2020 | Su ..................... H01M 10/0568 |

FOREIGN PATENT DOCUMENTS

| | | |
|---|---|---|
| CN | 102403535 A | 4/2012 |
| CN | 103443991 A | 12/2013 |

(Continued)

OTHER PUBLICATIONS

Ningder Age New Energy Technology Co. Ltd., First Office Action, CN201811140362.5, dated Sep. 10, 2020, 25 pgs.
(Continued)

*Primary Examiner* — Cynthia H Kelly
*Assistant Examiner* — Monique M Wills
(74) *Attorney, Agent, or Firm* — Kilpatrick Townsend & Stockton LLP

(57) ABSTRACT

This application provides a nonaqueous electrolytic solution, a lithium-ion battery, a battery module, a battery pack, and an apparatus. The nonaqueous electrolytic solution includes a nonaqueous solvent and a lithium salt. The nonaqueous solvent includes a carbonate solvent and a high-oxidation-potential solvent. The carbonate solvent is a mixture of a cyclic carbonate and a chain carbonate, and the high-oxidation-potential solvent is selected from one or more of compounds denoted by Formula I and Formula II. This application improves electrochemical performance of the lithium-ion battery under a high temperature and a high (Continued)

voltage as well as safety performance such as overcharge safety and hot-oven safety of the lithium-ion battery, and also ensures kinetic performance of the lithium-ion battery to some extent.

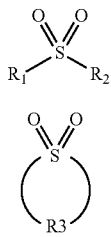

Formula I

Formula II

17 Claims, 4 Drawing Sheets

(51) Int. Cl.
*H01M 4/505* (2010.01)
*H01M 4/525* (2010.01)
*H01M 10/0525* (2010.01)
*H01M 10/0568* (2010.01)
*H01M 10/0569* (2010.01)
*H01M 50/40* (2021.01)
*H01M 4/02* (2006.01)

(52) U.S. Cl.
CPC ....... *H01M 4/525* (2013.01); *H01M 10/0525* (2013.01); *H01M 10/0568* (2013.01); *H01M 50/40* (2021.01); *H01M 2004/027* (2013.01); *H01M 2004/028* (2013.01); *H01M 2220/20* (2013.01); *H01M 2300/004* (2013.01)

(56) References Cited

FOREIGN PATENT DOCUMENTS

| | | | |
|---|---|---|---|
| CN | 103493276 | A | 1/2014 |
| CN | 104364958 | A | 2/2015 |
| CN | 104584164 | A | 4/2015 |
| CN | 105870505 | A | 8/2016 |
| CN | 106340672 | A | 1/2017 |
| CN | 107256983 | A | 10/2017 |
| JP | 2003132944 | A | 5/2003 |
| JP | 2013051342 | A | 3/2013 |
| WO | WO2016088837 | A1 | 6/2016 |

OTHER PUBLICATIONS

Ningder Age New Energy Technology Co. Ltd., Second Office Action, CN201811140362.5, dated Dec. 9, 2020, 11 pgs.
Ningder Age New Energy Technology Co. Ltd., Rejection Decision, CN201811140362.5, dated Mar. 1, 2021, 17 pgs.
Contemporary Amperex Technology Co., Limited, Extended European Search Report, EP19864522.8 dated Jul. 8, 2021, 7 pgs.
Contemporary Amperex Technology Co., Limited, International Search Report and Written Opinion, PCT/CN2019108605, dated Jan. 6, 2020, 13 pgs.
Wang et al., "Effect of the electrolyte additive of ethylene sulfate replacing propylene sulfate on the performance of Lithium-ion battery," Chinese Battery Industry, vol. 21 No. 2, Apr. 2017, http://www.zirankxzl.en/n/print.jsp, 5 pgs.
Automotive Technology Handbook, Society of Automotive Engineering of Japan, Inc., Copyright © 2011, ISBN 978-7-5640-8546-9, 7 pgs.
Chemical Power Supply Technology, 2006, ISBN-7-5603-2326-X, http://img.duxiu.com/n/print.jsp, 8 pgs.
Chi-Cheung Su et al., "Oxidatively Stable Fluorinated Sulfone Electrolytes for High Voltage High Energy Lithium-ion Battery," Energy and Environmental Science, vol. 10, No. 4, Jan. 1, 2017, ISSN: 1754-5692, DOI: 10.1039/C7EE00035A, pp. 900-904, 7 pgs.

\* cited by examiner

NONAQUEOUS ELECTROLYTIC SOLUTION, LITHIUM-ION BATTERY, BATTERY MODULE, BATTERY PACK, AND APPARATUS

CROSS REFERENCE TO RELATED APPLICATIONS

This application is a continuation application of PCT Patent Application No. PCT/CN2019/108605, entitled "NON-AQUEOUS ELECTROLYTE, LITHIUM ION BATTERY BATTERY MODULE, BATTERY PACK AND APPARATUS" filed on Sep. 27, 2019, which claims priority to Chinese Patent Application No. 201811140362.5, filed with the State Intellectual Property Office of the People's Republic of China on Sep. 28, 2018, and entitled "NON-AQUEOUS ELECTROLYTE AND LITHIUM ION BATTERY", all of which are incorporated herein by reference in their entirety.

TECHNICAL FIELD

This application relates to a nonaqueous electrolytic solution, a lithium-ion battery, a battery module, a battery pack, and an apparatus.

BACKGROUND

A lithium-ion battery is widely applied in electric vehicles and consumer electronic products by virtue of advantages such as a high energy density, a high output power, a long cycle life, and little environmental pollution. Current requirements for the lithium-ion battery are: a high voltage, a high power, a long cycle life, a long shelf life, and excellent safety performance.

The lithium-ion battery currently widely uses a nonaqueous electrolytic solution system that uses lithium hexafluorophosphate as a conductive lithium salt and that uses a cyclic carbonate and/or a chain carbonate as a solvent. However, still many disadvantages lie in the nonaqueous electrolytic solution. For example, in a high-voltage system, cycle performance, storage performance, and safety performance of the nonaqueous electrolytic solution need to be improved. For another example, in a lithium cobalt oxide or a high-nickel ternary system, safety performance such as overcharge safety and hot-oven safety of the lithium-ion battery also needs to be improved.

SUMMARY

In view of the problems in the background technologies, an objective of this application is to provide a nonaqueous electrolytic solution, a lithium-ion battery, a battery module, a battery pack, and an apparatus. The nonaqueous electrolytic solution improves electrochemical performance of the lithium-ion battery under a high temperature and a high voltage as well as safety performance such as overcharge safety and hot-oven safety of the lithium-ion battery, and also ensures kinetic performance of the lithium-ion battery to some extent.

To achieve the foregoing objective, according to a first aspect of this application, this application provides a nonaqueous electrolytic solution including a nonaqueous solvent and a lithium salt. The nonaqueous solvent includes a carbonate solvent and a high-oxidation-potential solvent. The carbonate solvent is a mixture of a cyclic carbonate and a chain carbonate, and the high-oxidation-potential solvent is selected from one or more of compounds denoted by Formula I and Formula II.

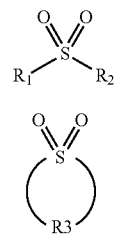

In Formula I, $R_1$ and $R_2$ are separately selected from unsubstituted, partially halogenated, or fully halogenated alkyls that include 1 to 5 carbon atoms, and at least one of $R_1$ or $R_2$ is a partially halogenated or fully halogenated alkyl that includes 1 to 5 carbon atoms; in Formula II, $R_3$ is selected from partially halogenated or fully halogenated alkylidenes that include 1 to 6 carbon atoms. A halogen atom thereof is selected from one or more of F, Cl, Br, or I.

According to a second aspect of this application, this application provides a lithium-ion battery, including a positive electrode plate, a negative electrode plate, a separator, and the nonaqueous electrolytic solution according to the first aspect of this application.

A third aspect of this application provides a battery module including the lithium-ion battery according to the second aspect of this application.

A fourth aspect of this application provides a battery pack including the battery module according to the third aspect of this application.

A fifth aspect of this application provides an apparatus including the lithium-ion battery according to the second aspect of this application. The lithium-ion battery is used as a power supply to the apparatus.

Compared with the prior art, this application achieves at least the following beneficial effects:

(1) the nonaqueous electrolytic solution according to this application integrates advantages of a high resistance to oxidation and non-flammability of the high-oxidation-potential solvent with an advantage of a low viscosity of the chain carbonate solvent and with an advantage of a high dielectric constant of the cyclic carbonate solvent, thereby improving electrochemical performance of the lithium-ion battery under a high temperature and a high voltage and also ensuring kinetic performance of the lithium-ion battery to some extent; and (2) the nonaqueous electrolytic solution according to this application uses a mixed solvent formed by a high-oxidation-potential solvent and a carbonate solvent, so as to overcome disadvantages such as poor resistance to oxidation, vulnerability to decomposition and gas generation under a high voltage, a low flash point, and flammability of a conventional carbonate solvent. Therefore, the nonaqueous electrolytic solution according to this application significantly improves safety performance such as overcharge safety and hot-oven safety of the lithium-ion battery.

The battery module, the battery pack, and the apparatus in this application include the lithium-ion battery, and therefore, have at least the same advantages as the lithium-ion battery.

Figure 1:
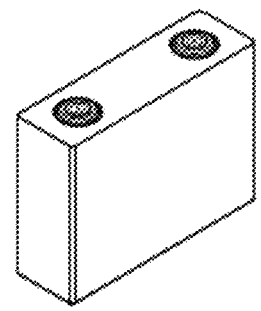
FIG. 1 is a three-dimensional view of an implementation of a lithium-ion battery.

Reference numerals are as follows:
1: Battery pack;
2: Upper container part;
3: Lower container part;
4: Battery module;
5: Lithium-ion battery;
51: Casing;
52: Electrode assembly;
521: First electrode plate;
521a: First current collector;
521b: First active material layer;
522: Second electrode plate;
522a: Second current collector;
522b: Second active material layer;
523: Separator;
524: First tab;
525: Second tab;
53: Top cover assembly.

DESCRIPTION OF EMBODIMENTS

The following describes in detail a nonaqueous electrolytic solution, a lithium-ion battery, a battery module, a battery pack, and an apparatus according to this application.

First, the nonaqueous electrolytic solution according to a first aspect of this application is described. The nonaqueous electrolytic solution includes a nonaqueous solvent and a lithium salt. The nonaqueous solvent includes a carbonate solvent and a high-oxidation-potential solvent. The carbonate solvent is a mixture of a cyclic carbonate and a chain carbonate, and the high-oxidation-potential solvent is selected from one or more of compounds denoted by Formula I and Formula II.

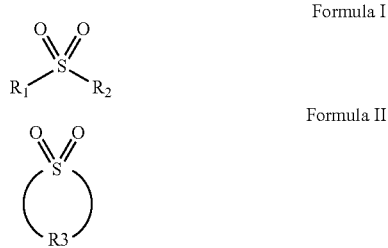

Formula I

Formula II

In Formula I, $R_1$ and $R_2$ are separately selected from unsubstituted, partially halogenated, or fully halogenated alkyls that include 1 to 5 carbon atoms, and at least one of $R_1$ or $R_2$ is a partially halogenated or fully halogenated alkyl that includes 1 to 5 carbon atoms; in Formula II, $R_3$ is selected from partially halogenated or fully halogenated alkylidenes that include 1 to 6 carbon atoms. A halogen atom thereof is selected from one or more of F, Cl, Br, or I, more specifically F. The alkyl and the alkylidene may be a linear structure or a branched structure. In a case that the alkyl or the alkylidene is partially or fully halogenated, there may be one or more types of halogen atoms.

Currently, a typical electrolytic solution of the lithium-ion battery is a carbonate solvent, for example, a chain carbonate, a cyclic carbonate, or a mixture thereof. Such solvent is inferior in resistance to oxidation, and is likely to oxidize and generate a gas when the lithium-ion battery is stored under a high temperature. In addition, gases generated out of oxidation of such solvent increase significantly with the rise of voltage and temperature. In addition, a flash point of such solvent is low (generally below 35° C.). The solvent is very likely to burn when exposed to an open flame, and emits a large amount of heat. Therefore, the lithium-ion battery that uses a conventional carbonate solvent is highly hazardous in safety performance.

In the nonaqueous electrolytic solution according to this application, a mixed solvent formed by a high-oxidation-potential solvent and a carbonate solvent (specifically, a mixture of a chain carbonate and a cyclic carbonate) is used. The high-oxidation-potential solvent has advantages of high resistance to oxidation and non-flammability, and can overcome disadvantages such as poor resistance to oxidation, vulnerability to decomposition and gas generation under a high voltage, a low flash point, and flammability of a conventional chain carbonate solvent. Therefore, the nonaqueous electrolytic solution according to this application significantly improves safety performance such as overcharge safety and hot-oven safety of the lithium-ion battery, and also improves electrochemical performance such as a long shelf life and a long cycle life of a battery system under a high temperature and a high voltage.

In the nonaqueous electrolytic solution according to this application, a high oxidation-potential solvent is added into the nonaqueous solvent. Therefore, the amount of the carbonate solvent used is reduced, the nonaqueous electrolytic solution is more resistant to oxidation, the disadvantages such as poor resistance to oxidation and vulnerability to decomposition and gas generation under a high voltage of the conventional carbonate solvent are mitigated, and therefore, safety performance such as hot-oven safety and overcharge safety of the lithium-ion battery is improved. Especially in a battery system in which a positive electrode is highly oxidative or has a relatively high oxidation potential, the nonaqueous electrolytic solution according to this application significantly improves the safety performance such as hot-oven safety and overcharge safety of the lithium-ion battery.

In the nonaqueous electrolytic solution according to this application, the carbonate solvent is a mixture of a cyclic carbonate and a chain carbonate. Generally, a viscosity of a high oxidation-potential solvent is relatively high, and is likely to affect conductivity of the nonaqueous electrolytic solution and thus affect a charge and discharge capacity, a cycle life, kinetic performance, and the like of the lithium-ion battery. The chain carbonate is characterized by a low viscosity, and therefore, significantly mitigates defects of a high viscosity of the high-oxidation-potential solvent. In addition, the cyclic carbonate is characterized by a high dielectric constant as against the high-oxidation-potential solvent. After being added, the cyclic carbonate improves dissolubility of the nonaqueous solvent for a lithium salt, and significantly mitigates the defect of a low dielectric constant of the high-oxidation-potential solvent. Therefore, the cyclic carbonate significantly improves conductivity of the nonaqueous electrolytic solution, and helps obtain a lithium-ion battery of good kinetic performance. Therefore, the nonaqueous electrolytic solution according to this application integrates advantages of a high resistance to oxidation and non-flammability of the high-oxidation-potential solvent with an advantage of a low viscosity of the chain carbonate solvent and with an advantage of a high dielectric constant of the cyclic carbonate solvent, thereby improving electrochemical performance of the lithium-ion battery under a high temperature and a high voltage and also ensuring kinetic performance of the lithium-ion battery to some extent.

In the nonaqueous electrolytic solution according to this application, when a weight percent content of the high-oxidation-potential solvent is relatively small, effects of mitigating the disadvantages such as poor resistance to oxidation, vulnerability to decomposition and gas generation under a high voltage, a low flash point, and flammability of the carbonate solvent are not significant. When the weight percent content of the high-oxidation-potential solvent is relatively large, an overall viscosity of the nonaqueous electrolytic solution increases significantly, and imposes a great impact on the kinetic performance of the lithium-ion battery. Therefore, more specifically, based on a total weight of the nonaqueous solvent, the weight percent content of the high-oxidation-potential solvent is 10%-60%. In this case, the advantages of the high resistance to oxidation and non-flammability of the high-oxidation-potential solvent are better integrated with the advantage of the low viscosity of the chain carbonate solvent and with the advantage of the high dielectric constant of the cyclic carbonate solvent, thereby improving electrochemical performance of the lithium-ion battery under a high temperature and a high voltage and also ensuring kinetic performance of the lithium-ion battery to some extent. In some embodiments, based on the total weight of the nonaqueous solvent, the weight percent content of the high-oxidation-potential solvent is 20%-40%.

In the nonaqueous electrolytic solution according to this application, the cyclic carbonate is characterized by a high dielectric constant. After being added, the cyclic carbonate increases dissolubility of the nonaqueous solvent for a lithium salt, and increases conductivity of the nonaqueous electrolytic solution. However, the cyclic carbonate is likely to oxidize and generate a gas at the positive electrode, and emits a relatively large amount of heat. Therefore, when the content of the cyclic carbonate is large, effects of improving the safety performance of the lithium-ion battery will be affected. Exemplarily, based on the total weight of the nonaqueous solvent, the weight percent content of the cyclic carbonate is greater than 0 but not greater than 10%. In some embodiments, based on the total weight of the nonaqueous solvent, the weight percent content of the cyclic carbonate is 3%-8%.

In the nonaqueous electrolytic solution according to this application, the chain carbonate is characterized by a low viscosity. After being added, the chain carbonate significantly mitigates defects of the high viscosity of the high-oxidation-potential solvent, reduces an overall viscosity of the nonaqueous electrolytic solution, and improves conductivity of the nonaqueous electrolytic solution. Exemplarily, a weight ratio of the chain carbonate to the cyclic carbonate is 80:1 to 1:1. In some embodiments, a weight ratio of the chain carbonate to the cyclic carbonate is 15:1 to 3:1.

In the nonaqueous electrolytic solution according to this application, the cyclic carbonate may be selected from one or more of compounds denoted by Formula III, and the chain carbonate may be selected from one or more of compounds denoted by Formula IV. In Formula III, $R_{11}$ is selected from unsubstituted alkyls that include 1 to 5 carbon atoms. In Formula IV, $R_{12}$ and $R_{13}$ are selected from unsubstituted alkyls that include 1 to 5 carbon atoms. where $R_{12}$ and $R_{13}$ may be the same or different. The alkyls may be a linear structure or a branched structure.

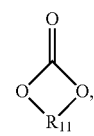

Formula III

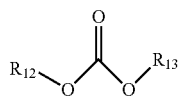

Formula IV

Exemplarily, the cyclic carbonate may be specifically selected from one or more of an ethylene carbonate or a propylene carbonate, and the chain carbonate may be specifically selected from one or more of an ethyl methyl carbonate, a methyl propyl carbonate, a methyl isopropyl carbonate, a methyl butyl carbonate, an ethylene propyl carbonate, a dimethyl carbonate, a diethyl carbonate, a dipropyl carbonate, or a dibutyl carbonate.

In the nonaqueous electrolytic solution according to this application, the viscosity of the high-oxidation-potential solvent is generally higher than that of the carbonate solvent, and is likely to affect conductivity of the nonaqueous electrolytic solution and affect a charge and discharge capacity, a cycle life, kinetic performance, and the like of the lithium-ion battery. Therefore, an appropriate type of carbonate solvent may be used together to improve the conductivity of the nonaqueous electrolytic solution, so as to further improve the charge and discharge capacity, the cycle life, and the kinetic performance, and the like of the lithium-ion battery. Exemplarily, the conductivity of the nonaqueous electrolytic solution under a normal temperature is controlled to be greater than or equal to 5.0 mS/cm. In some embodiments, the carbonate solvent includes at least one of an ethyl methyl carbonate, a dimethyl carbonate, or a diethyl carbonate. The viscosity of these chain carbonates is even lower, and therefore, can significantly make up for the disadvantage of the high viscosity of the high-oxidation potential solvent.

In the nonaqueous electrolytic solution according to this application, more specifically, the high-oxidation-potential solvent includes at least one F atom. Existence of the F atom further improves the resistance to oxidation and flame retardancy of the high-oxidation-potential solvent.

In the nonaqueous electrolytic solution according to this application, more specifically, in Formula I, $R_1$ and $R_2$ are separately selected from unsubstituted, partially fluorinated, or fully fluorinated alkyls that include 1 to 5 carbon atoms, and at least one of $R_1$ or $R_2$ is a partially fluorinated or fully fluorinated alkyl that includes 1 to 5 carbon atoms. In some embodiments, $R_1$ and $R_2$ are separately selected from —$CH_3$, —$CF_3$, —$CH_2CH_3$, —$CF_2CH_3$, —$CH_2CF_3$, —$CF_2CF_3$, —$CH_2CH_2CH_3$, —$CF_2CH_2CH_3$, —$CH_2CH_2CF_3$, —$CH_2CF_2CF_3$, —$CF_2CH_2CF_3$, —$CF_2CF_2CH_3$, and —$CF_2CF_2CF_3$, and at least one of $R_1$ or $R_2$ is —$CF_3$, —$CF_2CH_3$, —$CH_2CF_3$, —$CF_2CF_3$, —$CF_2CH_2CH_3$, —$CH_2CH_2CF_3$, —$CH_2CF_2CF_3$, —$CF_2CH_2CF_3$, —$CF_2CF_2CH_3$, or —$CF_2CF_2CF_3$.

In the nonaqueous electrolytic solution according to this application, more specifically, in Formula II, $R_3$ is selected from partially fluorinated or fully fluorinated alkylidenes that include 1 to 6 carbon atoms. In some embodiments, $R_3$ is selected from —$CHFCH_2CH_2CH_2$—, —$CF_2CH_2CH_2CH_2$—, —$CF_2CH_2CH_2CHF$—, —$CF_2CH_2CH_2CF_2$—, —$CH_2CH_2CHFCH_2$—, —$CH_2CHFCHFCH_2$—, —$CH_2CH_2CH(CF_3)CH_2$—, —$CF_2CH_2CH_2CH_2CH_2$—, —$CF_2CH_2CH_2CH_2CF_2$—, —$CH_2CH_2CH_2CHFCH_2$—, —$CH_2CHFCH_2CHFCH_2$—, —$CH_2CHFCH_2CHFCHF$—, —$CH_2CH_2CH_2CH_2CHF$—, —$CH_2CH_2CH_2CH(CF_3)CH_2$—, —$CF_2CH_2CH_2CH_2CH_2CH_2$—, —$CH_2CH_2CH_2CH_2CHFCH_2$—, —$CH_2CHFCH_2CH_2CHFCH_2$—, —$CF_2CH_2CH_2CH_2CH_2CF_2$—, —$CH_2CH_2CH(CH_3)CH_2CHFCH_2$—, or —$CH_2CH_2CH(CF_3)CH_2CHFCH_2$—.

In the nonaqueous electrolytic solution according to this application, when substituents $R_1$ and $R_2$ include a large quantity of carbon atoms and a large molecular weight, the viscosity of the high-oxidation-potential solvent is generally high, and an overall conductivity of the nonaqueous electrolytic solution may decrease to affect the effects of improving the kinetic performance and the electrochemical performance such as the cycle life of the lithium-ion battery. Exemplarily, $R_1$ and $R_2$ are separately selected from unsubstituted, partially halogenated, or fully halogenated alkyls that include 1 to 3 carbon atoms, and at least one of $R_1$ or $R_2$ is a partially halogenated or fully halogenated alkyl that includes 1 to 3 carbon atoms. In some embodiments, $R_1$ and $R_2$ are separately selected from unsubstituted, partially fluorinated, or fully fluorinated alkyls that include 1 to 3 carbon atoms, and at least one of $R_1$ or $R_2$ is a partially fluorinated or fully fluorinated alkyl that includes 1 to 3 carbon atoms.

In the nonaqueous electrolytic solution according to this application, when a substituent $R_3$ includes a large quantity of carbon atoms and a large molecular weight, the viscosity of the high-oxidation-potential solvent is generally high, and the overall conductivity of the nonaqueous electrolytic solution may decrease to affect the effects of improving the kinetic performance and the electrochemical performance such as the cycle life of the lithium-ion battery. Exemplarily, $R_3$ is selected from partially halogenated or fully halogenated alkylidenes that include 1 to 4 carbon atoms, and $R_3$ is selected from partially fluorinated or fully fluorinated alkylidenes that include 1 to 4 carbon atoms.

In the nonaqueous electrolytic solution according to this application, more specifically, the high-oxidation-potential solvent may be specifically selected from one or more of the following compounds:

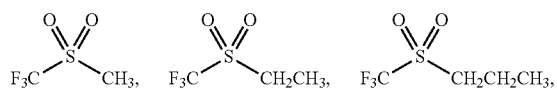

-continued

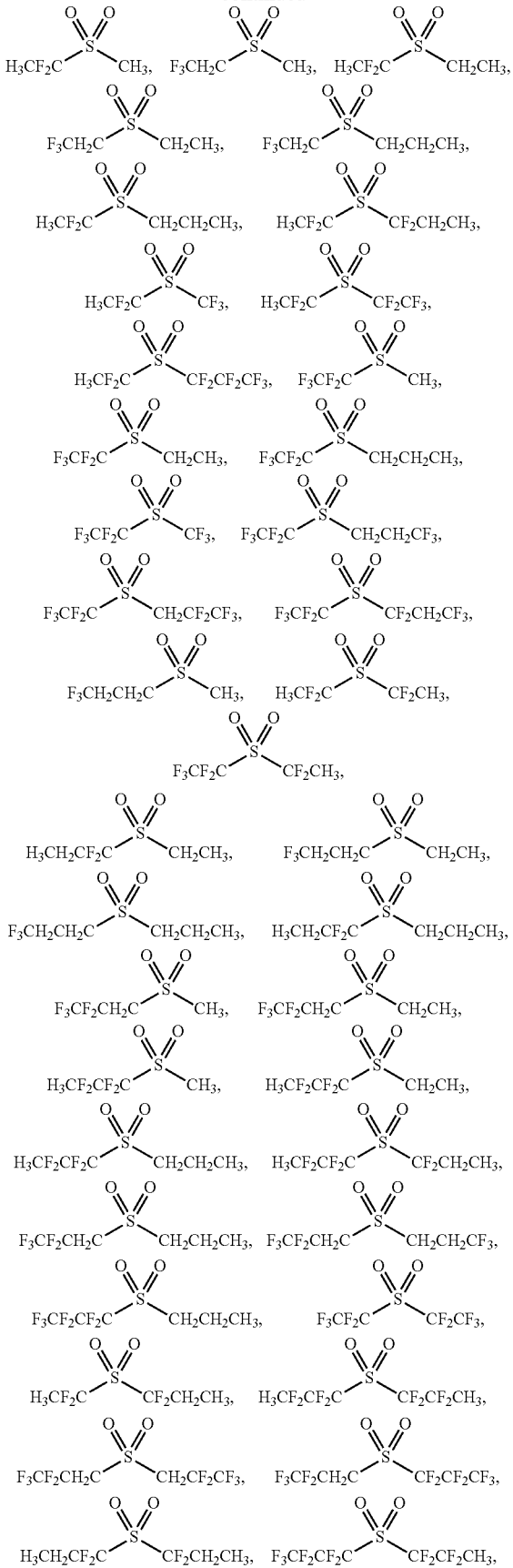

-continued

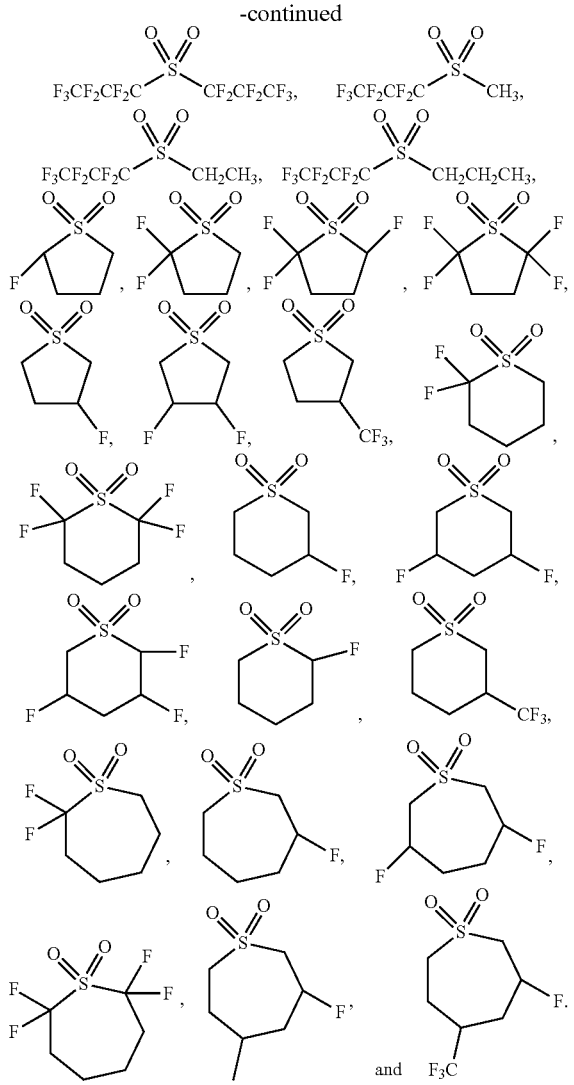

In the nonaqueous electrolytic solution according to this application, the high-oxidation-potential solvent is selected from one or more of compounds denoted by Formula I and Formula II. By comparison, the compound denoted by Formula I is characterized by a relatively low viscosity and a relatively low dielectric constant, but the compound denoted by Formula II is characterized by a relatively high viscosity and a relatively high dielectric constant. Therefore, more specifically, the high-oxidation-potential solvent includes both the compound denoted by Formula I and the compound denoted by Formula II. In some embodiments, the high-oxidation-potential solvent may include only the compound denoted by Formula I.

In the nonaqueous electrolytic solution according to this application, a weight of the compound denoted by Formula I is 30%-100% of a total weight of the high-oxidation-potential solvent, and a weight of the compound denoted by Formula II is 0%-70% of the total weight of the high-oxidation-potential solvent.

In the nonaqueous electrolytic solution according to this application, the specific type of the lithium salt is not limited, and may be any lithium salt applied to batteries in existing technologies. For example, the lithium salt may be specifically selected from one or more of LiPF$_6$, LiN(CF$_3$SO$_2$)$_2$, LiN(FSO$_2$)$_2$, LiBF$_4$, LiCF$_3$SO$_3$, or LiClO$_4$. To further improve the kinetic performance of the lithium-ion battery, more specifically, the lithium salt is LiPF$_6$.

In the nonaqueous electrolytic solution according to this application, a specific concentration of the lithium salt is not limited either, but may be adjusted according to actual needs. For example, the concentration of the lithium salt may be specifically 0.7 mol/L-2 mol/L.

In the nonaqueous electrolytic solution according to this application, more specifically, the nonaqueous electrolytic solution may further include a film-forming additive. The film-forming additive helps form an excellently performing interface protective film at a negative electrode and a positive electrode, thereby further improving the kinetic performance and the electrochemical performance such as the cycle life and shelf life of the lithium-ion battery.

Preferably, based on the total weight of the nonaqueous electrolytic solution, the weight percent content of the film-forming additive is 0.01%-10%. In some embodiments, based on the total weight of the nonaqueous electrolytic solution, the weight percent content of the film-forming additive is 0.1%-5%.

Exemplarily, the film-forming additive may be specifically selected from one or more of a cyclic carbonate compound with an unsaturated bond, a halogenated cyclic carbonate compound, a sulfate compound, a sulfite compound, a sultone compound, a disulfonate compound, a nitrile compound, an aromatic compound, an isocyanate compound, a phosphazene compound, a cyclic anhydride compound, a phosphite compound, a phosphate compound, a borate compound, or a carboxylic acid ester compound.

In some embodiments, the film-forming additive may be specifically selected from 1,3-propane sultone (PS), ethylene sulfate (DTD), fluoroethylene carbonate (FEC), difluoroethylene carbonate (DFEC), vinylene carbonate (VC), 1,3-propene sultone (PES), adiponitrile (ADN), or succinonitrile (SN). Such film-forming additives help form a stable interface protective film at the negative electrode and the positive electrode, and effectively suppress side reactions of the high oxidation potential solvent at the negative electrode and the positive electrode, thereby significantly improving the kinetic performance and the electrochemical performance such as the cycle life and storage life of the lithium-ion battery.

Still more desirably, the film-forming additive includes at least the DTD. Despite the advantages of high resistance to oxidation and non-flammability, the high-oxidation-potential solvent is hardly compatible with the negative electrode, and may give rise to side reactions at the negative electrode. After the DTD is added, the DTD can form a stable interface protective film at the negative electrode first to suppress the side reactions of the high-oxidation-potential solvent at the negative electrode. In addition, during participation in film formation of the negative electrode, the DTD can generate a lithium sulfate whose structure includes an alkoxy structure (—CH$_2$CH$_2$O—), thereby properly adjusting viscoelasticity of the interface protective film of the negative electrode, further improving lithium-ion interface transfer kinetics, and finally forming a thin and dense interface protective film of good lithium-ion transfer kinetics at the negative electrode. Further, the DTD may also form a stable interface protective film on a surface of the positive electrode to further improve the resistance to oxidation of the nonaqueous electrolytic solution. Therefore, after the DTD is added, the kinetic performance and the electrochemical performance such as the cycle life and shelf life of the lithium-ion battery are further improved, and the safety performance such as overcharge safety and hot-oven safety of the lithium-ion battery is improved to some extent.

Yet more desirably, the film-forming additive includes at least both the DTD and the FEC. With the FEC being added in addition to the DTD, the cycle life of the lithium-ion battery is further improved. A possible reason is: the FEC can be reduced to form a stable interface protective film at the negative electrode, thereby mitigating a reduction reaction of the DTD at the negative electrode, helping enhance film formation quality of the DTD on the surface of the positive electrode, and helping improve the cycle life of the lithium-ion battery.

Next, the lithium-ion battery according to a second aspect of this application is described.

Figure 2:
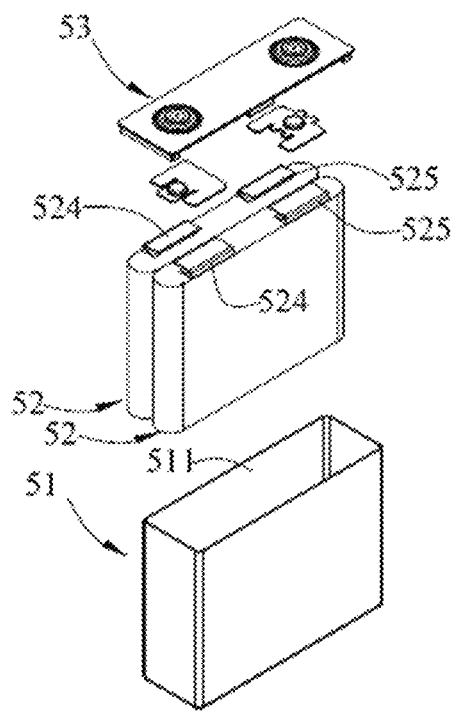
FIG. 2 is an exploded view of FIG. 1.
Figure 3:
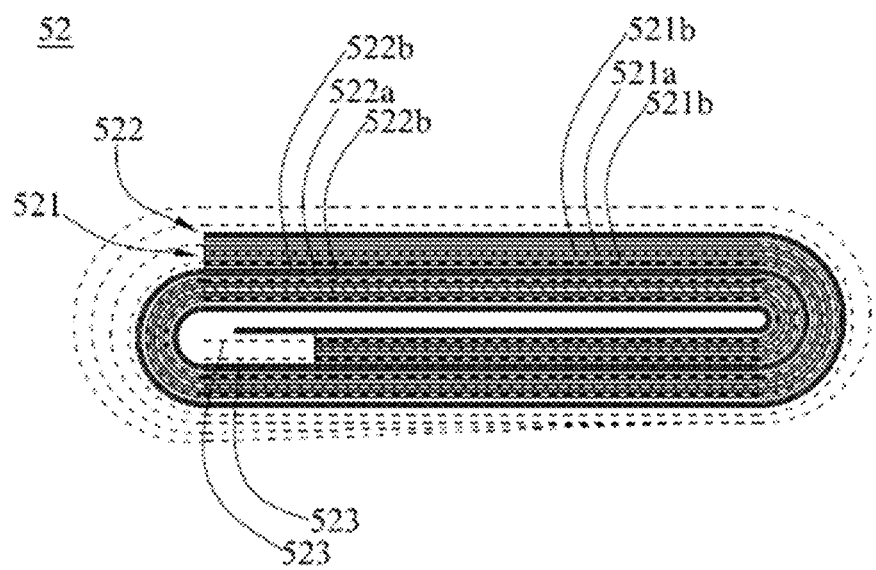
FIG. 3 is a schematic diagram of an implementation of an electrode assembly of the lithium-ion battery shown in FIG. 2, in which a first electrode plate, a second electrode plate and a separator are wound to form a wound electrode assembly.
Figure 4:
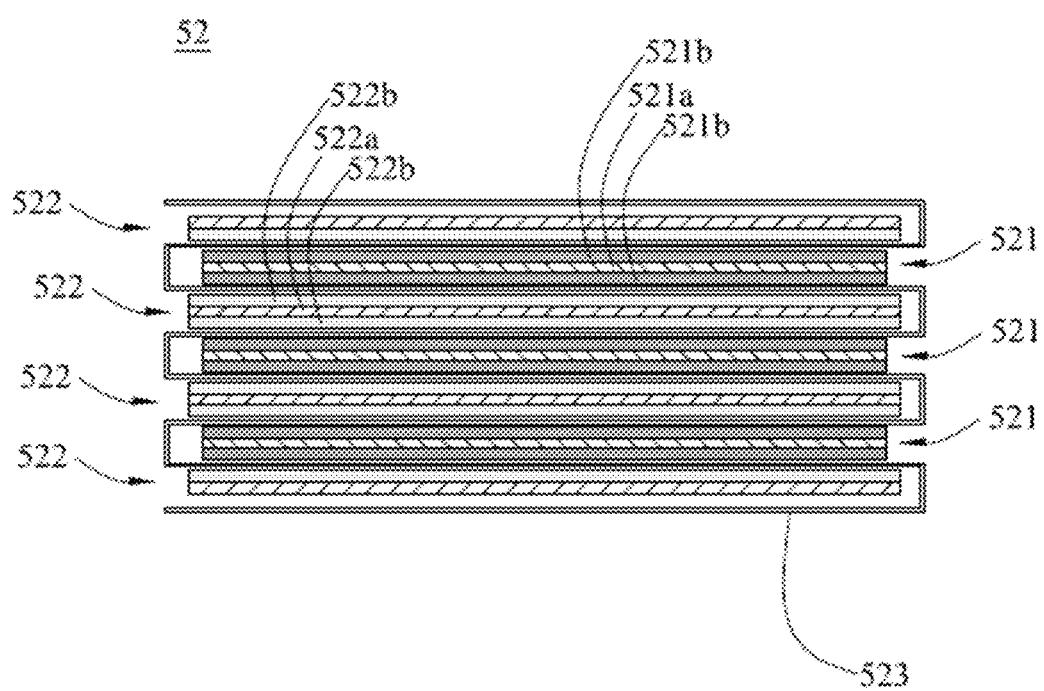
FIG. 4 is a schematic diagram of another implementation of an electrode assembly of the lithium-ion battery shown in FIG. 2, in which a first electrode plate, a second electrode plate and a separator are stacked along a thickness direction to form a stacked electrode assembly.

FIG. 1 is a three-dimensional view of an implementation of a lithium-ion battery 5. FIG. 2 is an exploded view of FIG. 1. FIG. 3 is a schematic diagram of an implementation of an electrode assembly 52 of the lithium-ion battery 5 shown in FIG. 2, in which a first electrode plate 521, a second electrode plate 522 and a separator 523 are wound to form a wound electrode assembly. FIG. 4 is a schematic diagram of another implementation of an electrode assembly 52 of the lithium-ion battery 5 shown in FIG. 2, in which a first electrode plate 521, a second electrode plate 522 and a separator 523 are stacked along a thickness direction to form a stacked electrode assembly.

Referring to FIG. 1 to FIG. 4, the lithium-ion battery 5 includes a casing 51, an electrode assembly 52, a top cover assembly 53, and an electrolytic solution (not shown).

The electrode assembly 52 is accommodated in the casing 51. The electrode assembly 52 includes the first electrode plate 521, the second electrode plate 522, the separator 523, a first tab 524, and a second tab 525. The separator 523 separates the first electrode plate 521 from the second electrode plate 522.

The first electrode plate 521 includes a first current collector 521a and a first active material layer 521b disposed on a surface of the first current collector 521a. The first active material layer 521b includes a first active material. The first active material layer 521b may be disposed on one surface or two surfaces of the first current collector 521a according to actual needs. The second electrode plate 522 includes a second current collector 522a and a second active material layer 522b disposed on a surface of the second current collector 522a. The second active material layer 522b may be disposed on one surface or two surfaces of the second current collector 522a according to actual needs. The second active material layer 522b includes a second active material. The first active material and the second active material deintercalate lithium ions. The first electrode plate 521 is electrically opposite to the second electrode plate 522. Specifically, one of the first electrode plate 521 or the second electrode plate 522 is a positive electrode plate, and the other of the first electrode plate 521 or the second electrode plate 522 is a negative electrode plate. The first tab 524 may be formed by cutting the first current collector 521a or separately formed, and fixedly connected to the first current collector 521a. Similarly, the second tab 525 may be formed by cutting the second current collector 522a or separately formed, and fixedly connected to the second current collector 522a.

The quantity of electrode assemblies 52 is not limited, and may be one or more.

The electrolytic solution is injected into the casing 51 and infiltrates the electrode assembly 51, and specifically infiltrates the first electrode plate 521, the second electrode plate 522, and the separator 523.

It needs to be noted that the lithium-ion battery 5 shown in FIG. 1 is, but without limitation, a can-shaped battery. The lithium-ion battery 5 may be a pouch-shaped battery, in which the casing 51 is replaced with a metal laminated film and the top cover assembly 53 is canceled.

In the lithium-ion battery 5, one of the first electrode plate 521 or the second electrode plate 522 is a positive electrode plate. Therefore, a current collector of the positive electrode plate is a positive electrode current collector, and an active material layer of the positive electrode plate is a positive electrode active material layer, and an active material of the positive electrode plate is a positive electrode active material. Accordingly, the positive electrode plate includes the positive electrode current collector and the positive electrode active material layer disposed on the positive electrode current collector.

In other words, the lithium-ion battery according to the second aspect of this application includes the positive electrode plate, the negative electrode plate, the separator, and the nonaqueous electrolytic solution that is used as the electrolytic solution and disclosed in the first aspect of this application.

In the lithium-ion battery according to this application, the positive electrode plate may include a positive electrode active material, a conductive agent, and a binder. The positive electrode active material may be selected from a layered lithium-containing oxide, a spinel-type lithium-containing oxide, or the like. Specifically, the positive electrode active material may be selected from one or more of a lithium cobalt oxide, a lithium nickel oxide, a lithium manganese oxide, a lithium nickel manganese oxide, a lithium nickel cobalt manganese oxide, or a lithium nickel cobalt aluminum oxide. However, this application is not limited to such materials, and other conventional and well-known materials that can be used as a positive electrode active material of the lithium-ion battery may be used instead. One of such positive electrode active materials may be used alone, or a combination of two or more thereof may be used, in which a combination ratio may be properly adjusted according to actual needs. Specific types of the conductive agent and the binder are not limited, and may be selected according to actual needs.

When a voltage of the lithium-ion battery is relatively high, the lithium-ion battery may have a higher charge and discharge capacity and a higher energy density. However, a conventional electrolytic solution may be oxidized to generate a gas and emit heat to deteriorate a service life and high-temperature performance of the lithium-ion battery. Especially in a process of abuse, for example, in a 150° C. hot oven, the lithium-ion battery is very likely to burn. However, the nonaqueous electrolytic solution according to this application includes a high-oxidation-potential solvent. The solvent can significantly improve the resistance to oxidation of the nonaqueous electrolytic solution and reduce the emitted heat, so as to significantly improve high-temperature performance of the lithium-ion battery. Therefore, the nonaqueous electrolytic solution according to this application achieves clearer effects of improving a battery system characterized by high oxidizability or a high oxidation potential of the positive electrode, and achieves even clearer effects of improving the electrochemical performance of the lithium-ion battery especially under a high temperature and a high voltage. Gas generation of the lithium-ion battery under a high temperature and a high voltage can be suppressed more significantly, and the safety performance such as overcharge safety and hot-oven safety of the lithium-ion battery can also be improved more significantly.

Exemplarily, the positive electrode active material is one or more of $Li_{1+x}Ni_aCo_bM'_{(1-a-b)}O_{2-c}Y_c$ or $Li_{1+y}Ni_mMn_nM''_{2-m-n}O_{4-p}Z_p$, where $-0.1 \leq x \leq 0.2$, $0.6 \leq a \leq 1$, $0 \leq b \leq 1$, $0 \leq (1-a-b) < 1$, $0 \leq c < 1$, M' is selected from one or more of Mn, Al, Mg, Zn, Ga, Ba, Fe, Cr, Sn, V, Sc, Ti, or Zr, and Y is selected from one or more of F, Cl, or Br; $-0.1 \leq y \leq 0.2$, $0.4 \leq m \leq 1.2$, $0.8 \leq n \leq 1.6$, $0 \leq (2-m-n) \leq 0.3$, $0 \leq p \leq 1$, M" is selected from one or more of Al, Mg, Zn, Ga, Ba, Fe, Cr, Sn, V, Sc, Ti, or Zr, and Z is selected from one or more of F, Cl, or Br. In some embodiments, the positive electrode active material may be specifically selected from one or more of $LiNi_{0.6}Co_{0.2}Mn_{0.2}O_2$, $LiNi_{0.8}Co_{0.1}Mn_{0.1}O_2$, $LiNi_{0.85}Co_{0.15}Al_{0.05}O_2$, or $LiNi_{0.5}Mn_{1.5}O_4$. With increase of a Ni content in the positive electrode active material, the charge and discharge capacity of the positive electrode active material increases, but thermal stability of the positive electrode active material decreases. The positive electrode active material under a high temperature emits a highly oxidizable substance to oxidize the nonaqueous electrolytic solution and deteriorate high-temperature performance of the lithium-ion battery. However, the nonaqueous electrolytic solution according to this application includes a high-oxidation-potential solvent that is resistant to oxidation and can significantly improve the resistance to oxidation of the nonaqueous electrolytic solution and reduce emitted heat, so as to significantly improve the high-temperature performance of the lithium-ion battery.

In the lithium-ion battery according to this application, more specifically, a charge cut-off voltage of the lithium-ion battery is U, where $4.3V \leq U \leq 6V$. In other words, the nonaqueous electrolytic solution according to this application can increase the charge cut-off voltage of the lithium-ion battery to 4.3 V or more.

In the lithium-ion battery according to this application, the negative electrode plate may include a negative electrode active material, a conductive agent, and a binder. Exemplarily, the negative electrode active material is selected from a carbon-based material, a silicon-based material, a tin-based material, or the like. Specifically, the negative electrode active material may be selected from soft carbon, hard carbon, artificial graphite, natural graphite, silicon, a silicon oxide compound, a silicon carbon composite, a silicon alloy, tin, a tin oxide compound, a tin alloy, a lithium titanate oxide, or a metal that can combine with lithium to form an alloy, or the like. However, this application is not limited to such materials, and other conventional and well-known materials that can be used as a negative electrode active material of the lithium-ion battery may be used instead. One of such negative electrode active materials may be used alone, or a combination of two or more thereof may be used, in which a combination ratio may be properly adjusted according to actual needs. Specific types of the conductive agent and the binder are not limited, and may be selected according to actual needs.

In the lithium-ion battery according to this application, specific types of the separator are not limited, and may be made of any separator material used in conventional lithium-ion secondary batteries. For example, the separator may be a polyolefin separator or a ceramic separator. Specifically, the separator may more specifically be polyethylene, polypropylene, polyvinylidene fluoride or a multilayer composite film thereof, but this application is not limited thereto.

Next, a battery module according to a third aspect of this application is described.

Figure 5:
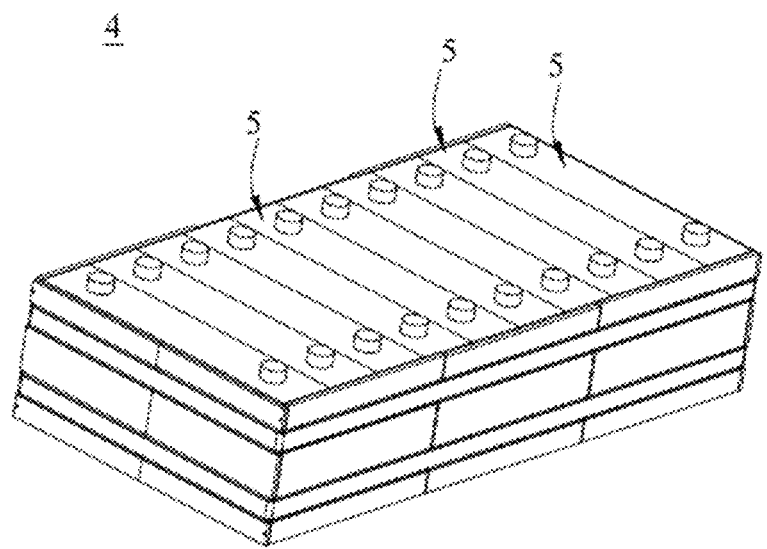
FIG. 5 is a three-dimensional view of an implementation of a battery module.

FIG. 5 is a three-dimensional view of an implementation of a battery module 4.

The battery module 4 according to the third aspect of this application includes the lithium-ion battery 5 according to the second aspect of this application.

Referring to FIG. 5, the battery module 4 includes a plurality of lithium-ion batteries 5. The plurality of lithium-ion batteries 5 are arranged in a longitudinal direction. The battery module 4 may be used as a power supply or an energy storage apparatus. The quantity of the lithium-ion batteries 5 in the battery module 4 may be adjusted according to factors such as the application and capacity design of the battery module 4.

Next, a battery pack according to a fourth aspect of this application is described.

Figure 6:
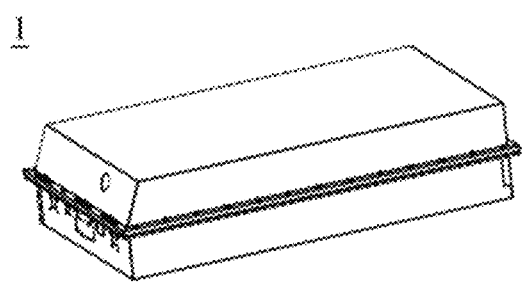
FIG. 6 is a three-dimensional view of an implementation of a battery pack.
Figure 7:
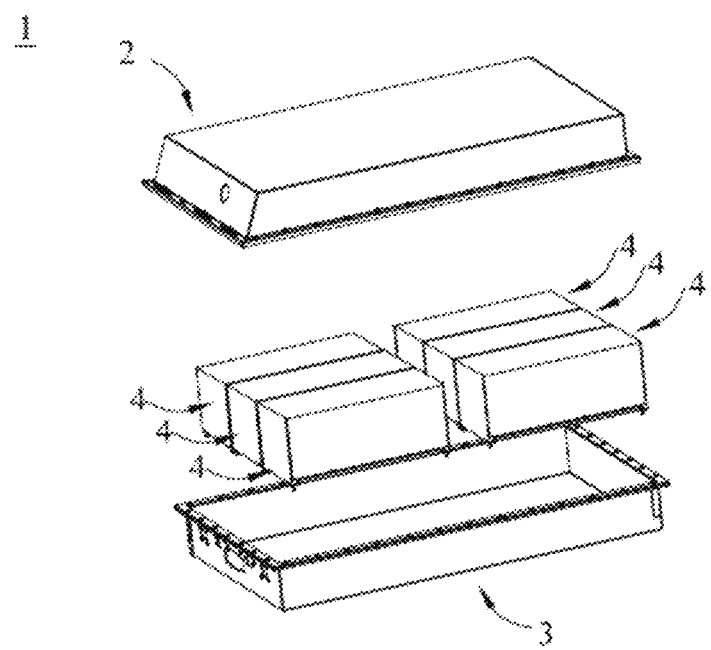
FIG. 7 is an exploded view of FIG. 6.

FIG. 6 is a three-dimensional view of an implementation of a battery pack 1. FIG. 7 is an exploded view of FIG. 6.

The battery pack 1 provided in the fourth aspect of this application includes the battery module 4 according to the third aspect of this application.

Specifically, referring to FIG. 6 and FIG. 7, the battery pack 1 includes an upper container part 2, a lower container part 3, and a battery module 4. The upper container part 2 and the lower container part 3 are assembled together to form a space for accommodating the battery module 4. The battery module 4 is fitted into a space formed by assembling the upper container part 2 and the lower container part 3 together. An output electrode of the battery module 4 is led out from either the upper container part 2 or the lower container part 3 or from between the upper container part 2 and the lower container part 3 so as to supply power to the outside or to be charged from the outside. The quantity and arrangement of battery modules 4 adopted by the battery pack 1 may be determined according to actual needs. The battery pack 1 may be used as a power supply or an energy storage apparatus.

Next, an apparatus according to a fifth aspect of this application is described.

Figure 8:
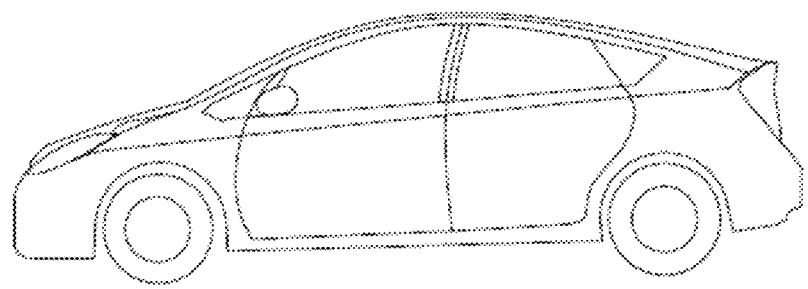
FIG. 8 is a schematic diagram of an implementation of an apparatus whose power supply is a lithium-ion battery.

FIG. 8 is a schematic diagram of an implementation of an apparatus whose power supply is a lithium-ion battery.

An apparatus provided in the fifth aspect of this application includes the lithium-ion battery according to the second aspect of this application. The lithium-ion battery is used as a power supply to the apparatus. In FIG. 8, the apparatus that adopts the lithium-ion battery 5 is an electric vehicle. Nevertheless, without being limited to the electric vehicle, the apparatus that adopts the lithium-ion battery 5 may be any electric means of transport other than the electric vehicle (for example, an electric bus, an electric tram, an electric bicycle, an electric motorcycle, an electric scooter, an electric golf cart, and an electric truck), an electric ship, an electric tool, an electronic device, and an energy storage system. The electric vehicle may be a battery electric vehicle, a hybrid electric vehicle, or a plug-in hybrid electric vehicle. Depending on the actual use form, the apparatus according to the fifth aspect of this application may include the battery module 4 according to the third aspect of this application. The apparatus according to the fifth aspect of this application may also include the battery pack 1 according to the fourth aspect of this application.

To make the objectives, technical solutions, and beneficial effects of this application clearer, the following describes this application in further detail with reference to embodiments. Understandably, the embodiments described in this specification are intended only for interpreting this application rather than limiting this application. Formulas and ratios in the embodiments may be selected according to actual conditions without substantively affecting results.

For ease of description, reagents used in preparing the nonaqueous electrolytic solution are abbreviated as follows:

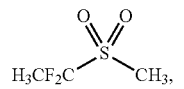 A1

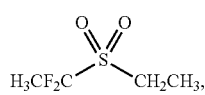 A2

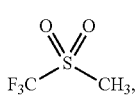 A3

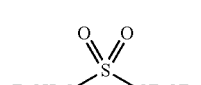 A4

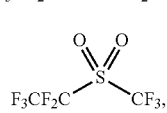 A5

 A6

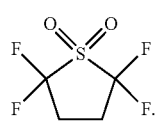 A7

Embodiment 1

(1) Preparing a Nonaqueous Electrolytic Solution

Mixing an ethylene carbonate (EC), an ethyl methyl carbonate (EMC), and a compound A1 at a weight ratio of 5:35:60 to obtain a nonaqueous solvent, and then dissolving a lithium salt $LiPF_6$ at a concentration of 1 mol/L to prepare a nonaqueous electrolytic solution.

(2) Preparing a Positive Electrode Plate

Fully stirring and homogeneously mixing $LiNi_{0.8}Co_{0.1}Mn_{0.1}O_2$ as a positive electrode active material, acetylene black as a conductive agent, and a polyvinylidene fluoride (PVDF) as a binder in an N-methylpyrrolidone solvent system at a weight ratio of 94:3:3, then coating a current collector aluminum foil with a solution thereby obtained, and performing drying and cold calendering to obtain a positive electrode plate.

(3) Preparing a Negative Electrode Plate

Fully stirring and homogeneously mixing artificial graphite as a negative electrode active material, acetylene black as a conductive agent, styrene butadiene rubber as a binder, and sodium carboxymethyl cellulose as a thickener at a weight ratio of 95:2:2:1 in a deionized water solvent system, then coating a current collector Cu copper foil with a solution thereby obtained, and performing drying and cold calendering to obtain a negative electrode plate.

(4) Preparing a Separator

Using a polyethylene film as a separator.

(5) Preparing a Lithium-Ion Battery

Sequentially stacking the foregoing positive electrode plate, separator, and negative electrode plate so that the separator is located between the positive electrode plate and the negative electrode plate for a purpose of separation, and then winding the stacked plates to obtain an electrode assembly; placing the electrode assembly in an outer packaging shell, drying the electrode assembly and then injecting a nonaqueous electrolytic solution into the outer packaging shell, and performing steps such as vacuum packaging, standing, formation, and reshaping to obtain a lithium-ion battery.

Lithium-ion batteries in Embodiments 2-28 and Comparative Embodiments 1-4 are prepared according to a method similar to that of Embodiment 1 except differences shown in Table 1.

TABLE 1

Composition of nonaqueous electrolytic solutions in Embodiments 1-28 and Comparative Embodiments 1-4

| | Composition of nonaqueous solvent and weight percent of each component | | | | | | Additive | |
|---|---|---|---|---|---|---|---|---|
| | High-oxidation-potential solvent | | Chain carbonate | | Cyclic carbonate | | Component | Content |
| Embodiment 1 | A1 | 60% | EMC | 35% | EC | 5% | / | / |
| Embodiment 2 | A1 | 50% | EMC | 45% | EC | 5% | / | / |
| Embodiment 3 | A1 | 40% | EMC | 55% | EC | 5% | / | / |
| Embodiment 4 | A1 | 30% | EMC | 65% | EC | 5% | / | / |
| Embodiment 5 | A1 | 20% | EMC | 75% | EC | 5% | / | / |
| Embodiment 6 | A1 | 10% | EMC | 85% | EC | 5% | / | / |
| Embodiment 7 | A1 | 70% | EMC | 25% | EC | 5% | / | / |
| Embodiment 8 | A1 | 5% | EMC | 90% | EC | 5% | / | / |
| Embodiment 9 | A1 | 30% | EMC | 68% | EC | 2% | / | / |
| Embodiment 10 | A1 | 30% | EMC | 62% | EC | 8% | / | / |
| Embodiment 11 | A1 | 30% | EMC | 60% | EC | 10% | / | / |
| Embodiment 12 | A1 | 30% | EMC | 58% | EC | 12% | / | / |
| Embodiment 13 | A2 | 30% | EMC | 65% | EC | 5% | / | / |
| Embodiment 14 | A3 | 30% | EMC | 65% | EC | 5% | / | / |
| Embodiment 15 | A4 | 30% | EMC | 65% | EC | 5% | / | / |
| Embodiment 16 | A5 | 30% | EMC | 65% | EC | 5% | / | / |
| Embodiment 17 | A6 | 30% | EMC | 65% | EC | 5% | / | / |

TABLE 1-continued

Composition of nonaqueous electrolytic solutions in Embodiments 1-28 and Comparative Embodiments 1-4

| | Composition of nonaqueous solvent and weight percent of each component | | | | | | Additive | |
|---|---|---|---|---|---|---|---|---|
| | High-oxidation-potential solvent | | Chain carbonate | | Cyclic carbonate | | Component | Content |
| Embodiment 18 | A7 | 30% | EMC | 65% | EC | 5% | / | / |
| Embodiment 19 | A1:A6 = 70:30 | 30% | EMC | 65% | EC | 5% | / | / |
| Embodiment 20 | A2:A7 = 60:40 | 30% | EMC | 65% | EC | 5% | / | / |
| Embodiment 21 | A1 | 30% | EMC | 65% | EC | 5% | DTD | 2% |
| Embodiment 22 | A1 | 30% | EMC | 65% | EC | 5% | PS | 2% |
| Embodiment 23 | A1 | 30% | EMC | 65% | EC | 5% | VC | 2% |
| Embodiment 24 | A1 | 30% | EMC | 65% | EC | 5% | FEC | 2% |
| Embodiment 25 | A1 | 30% | EMC | 65% | EC | 5% | PES | 2% |
| Embodiment 26 | A1 | 30% | EMC | 65% | EC | 5% | ADN | 2% |
| Embodiment 27 | A1 | 30% | EMC | 65% | EC | 5% | SN | 2% |
| Embodiment 28 | A1 | 30% | EMC | 65% | EC | 5% | DTD + FEC | 1% + 1% |
| Comparative Embodiment 1 | / | / | EMC | 70% | EC | 30% | / | / |
| Comparative Embodiment 2 | A1 | 100% | / | / | / | / | / | / |
| Comparative Embodiment 3 | A1 | 30% | / | / | EC | 70% | / | / |
| Comparative Embodiment 4 | Methyl ethyl sulfone | 30% | EMC | 65% | EC | 5% | / | / |

The following describes a performance test of the lithium-ion battery.

(1) Testing Gas Generation of the Lithium-Ion Battery Stored Under a High Temperature Taking 5 lithium-ion batteries prepared in the embodiments and the comparative embodiments separately, charging the batteries until a voltage of 4.3 V under a normal temperature by using a 0.5 C constant current (that is, a current value by which a theoretical capacity of the lithium-ion battery is fully discharged within 2 hours), further charging the lithium-ion batteries under a 4.3 V constant voltage until the current is lower than 0.05 C, and leaving the lithium-ion batteries to be in a 4.3 V fully charged state, with a volume of a fully charged battery before storage being D0. Leaving the fully charged batteries in an oven under 85° C. for 10 days, taking out the batteries, and measuring the size of the batteries after the storage, with the measured volume being D1.

Volume expansion rate (%) of the lithium-ion battery
$\varepsilon = (D1 - D0)/D0 \times 100\%$.

(2) Testing Thermal Shock Safety Performance (Hot Oven)

Taking 5 lithium-ion batteries prepared in the embodiments and the comparative embodiments separately, and charging the batteries until a voltage of 4.3 V under a normal temperature by using a 0.5 C constant current, further charging the lithium-ion batteries under a 4.3 V constant voltage until the current is lower than 0.05 C. Then leaving the lithium-ion batteries in a thermostat, heating the thermostat to 150° C. at a temperature rise speed of 5° C./min, and recording the time h1 consumed for increasing a temperature of the thermostat from the normal temperature to 150° C. Then drying the lithium-ion batteries in a 150° C. thermostat until the lithium-ion batteries smoke and catch fire. Recording the time h2 consumed from the start of temperature rise of the thermostat under a normal temperature to the smoking and catching fire of the lithium-ion batteries.

The thermal shock safety performance of the lithium-ion batteries is represented by the time (h2−h1) for how long the lithium-ion batteries withstand drying under 150° C.

(3) Testing Cycle Performance

Taking 5 lithium-ion batteries prepared in the embodiments and the comparative embodiments separately, charging and discharging the lithium-ion batteries repeatedly by performing the following steps, and calculating a discharge capacity retention rate of the lithium-ion batteries.

First, performing a first cycle of charging and discharging in a normal temperature environment, charging the lithium-ion batteries until an upper-limit voltage of 4.3 V by using a 0.5 C constant charge current, and then charging the lithium-ion batteries under a 4.3 V constant voltage until the current is lower than 0.05 C. Then discharging the lithium-ion batteries by using a 0.5 C constant discharge current until a final voltage of 3 V, and recording a discharge capacity of the first cycle. Performing 500 cycles of charging and discharging according to the above operations and recording a discharge capacity at the 500th cycle.

Cyclic capacity retention rate of the lithium-ion batteries=(the discharge capacity at the 500th cycle/the discharge capacity at the first cycle× 100%.

(4) Testing Kinetic Performance

Taking 5 lithium-ion batteries prepared in the embodiments and the comparative embodiments separately, and carrying out a test in a normal temperature environment. First, charging the lithium-ion batteries until an upper-limit voltage of 4.3 V by using a 0.5 C constant charge current, and then charging the lithium-ion batteries under a 4.3 V constant voltage until the current is lower than 0.05 C. Then discharging the lithium-ion batteries by using different C-rates (0.5 C, 2 C) of a constant current until a final voltage of 3 V, and recording discharge capacities under different C-rates.

The kinetic performance of the lithium-ion batteries is represented by a ratio of the discharge capacity of the lithium-ion batteries under a 2 C-rate to the discharge capacity under a 0.5 C-rate.

TABLE 2

Performance test results of Embodiments 1-28 and Comparative Embodiments 1-4

| | Volume expansion rate ε | Hot-oven safety performance h2 − h1 (min) | Cyclic capacity retention rate | 2 C/ 0.5 C |
|---|---|---|---|---|
| Embodiment 1 | 12% | 56 | 62% | 54% |
| Embodiment 2 | 14% | 52 | 67% | 57% |
| Embodiment 3 | 15% | 50 | 72% | 60% |
| Embodiment 4 | 16% | 47 | 76% | 63% |
| Embodiment 5 | 17% | 36 | 80% | 65% |
| Embodiment 6 | 18% | 27 | 81% | 72% |
| Embodiment 7 | 11% | 60 | 52% | 45% |
| Embodiment 8 | 20% | 13 | 82% | 75% |
| Embodiment 9 | 13% | 51 | 74% | 57% |
| Embodiment 10 | 20% | 43 | 78% | 67% |
| Embodiment 11 | 22% | 38 | 81% | 71% |
| Embodiment 12 | 28% | 25 | 82% | 73% |
| Embodiment 13 | 16% | 48 | 76% | 63% |
| Embodiment 14 | 17% | 47 | 77% | 62% |
| Embodiment 15 | 15% | 46 | 76% | 64% |
| Embodiment 16 | 16% | 47 | 75% | 63% |
| Embodiment 17 | 14% | 50 | 73% | 57% |
| Embodiment 18 | 13% | 52 | 72% | 55% |
| Embodiment 19 | 15% | 48 | 74% | 60% |
| Embodiment 20 | 15% | 49 | 73% | 59% |
| Embodiment 21 | 7% | 52 | 80% | 67% |
| Embodiment 22 | 6% | 53 | 81% | 65% |
| Embodiment 23 | 20% | 42 | 78% | 60% |
| Embodiment 24 | 18% | 52 | 84% | 67% |
| Embodiment 25 | 4% | 56 | 76% | 57% |
| Embodiment 26 | 12% | 51 | 68% | 52% |
| Embodiment 27 | 13% | 50 | 67% | 51% |
| Embodiment 28 | 5% | 50 | 86% | 67% |
| Comparative Embodiment 1 | 75% | 2 | 88% | 83% |
| Comparative Embodiment 2 | 8% | 63 | 45% | 35% |
| Comparative Embodiment 3 | 89% | 5 | 34% | 12% |
| Comparative Embodiment 4 | 19% | 18 | 76% | 65% |

As can be learned from the test results of Comparative Embodiments 1-3 and Embodiments 1-12, when solvents of the nonaqueous electrolytic solution concurrently include a cyclic carbonate, a chain carbonate, and a high-oxidation-potential solvent, the high-temperature storage performance and the hot-oven safety performance of the lithium-ion batteries are improved significantly, and the cycle performance and the kinetic performance of the lithium-ion batteries are good.

When the solvents of the nonaqueous electrolytic solution include only a cyclic carbonate and a chain carbonate, the nonaqueous electrolytic solution is hardly resistant to oxidation, likely to decompose under a high voltage and generate a gas, and characterized by a low flash point and flammability, and the lithium-ion batteries are inferior in the high-temperature storage performance and the hot-oven safety performance. When the solvents of the nonaqueous electrolytic solution include only a high-oxidation-potential solvent, due to a relatively high viscosity thereof, an overall viscosity of the nonaqueous electrolytic solution is relatively high, conductivity of the nonaqueous electrolytic solution is relatively low, and the cycle performance and the kinetic performance of the lithium-ion batteries are deteriorated significantly. When the solvents of the non-aqueous electrolytic solution include only a cyclic carbonate and a high-oxidation-potential solvent, the viscosity of both the cyclic carbonate and the high-oxidation-potential solvent is relatively high, the kinetic performance of the lithium-ion batteries is still poor. In addition, lithium plating is very likely to occur at the negative electrode during charging and discharging, and the cycle performance of lithium-ion batteries is inferior. Further, a large amount of cyclic carbonate is likely to oxidize and generate a gas at the positive electrode and emit a large amount of heat, and the high-temperature storage performance and the hot-oven safety performance of the lithium-ion batteries will also be deteriorated significantly.

As can be learned from the test results of Embodiments 1-8, when a weight percent content of the high-oxidation-potential solvent is relatively small, effects of overcoming the disadvantages such as poor resistance to oxidation, a low flash point, and flammability of the chain carbonate solvent are not significant. When the weight percent content of the high-oxidation-potential solvent is relatively large, an overall viscosity of the nonaqueous electrolytic solution increases significantly, and generates a great impact on the kinetic performance of the lithium-ion batteries. Therefore, based on the total weight of the nonaqueous solvent, the weight percent content of the high-oxidation-potential solvent is more specifically 10%-60%.

As can be learned from the test results of Embodiment 4 and Embodiments 9-12, the dielectric constant of the high-oxidation-potential solvent and the chain carbonate is not high. Therefore, a cyclic carbonate characterized by a high dielectric constant needs to be added to increase dissolubility of the nonaqueous solvent for a lithium salt and increase conductivity of the nonaqueous electrolytic solution. However, the cyclic carbonate is more likely to oxidize and generate a gas at the positive electrode, and emits a relatively large amount of heat. When a relatively large amount of the cyclic carbonate is added, the high-temperature storage performance and the hot-oven safety performance of the lithium-ion batteries will be affected significantly. Therefore, based on the total weight of the nonaqueous solvent, the weight percent content of the cyclic carbonate is more specifically not greater than 10%.

As can be learned from the test results of Comparative Embodiment 4 in comparison with Embodiments 13-20, the non-fluorinated high-oxidation-potential solvent is hardly resistant to oxidation and not flame-retardant, and therefore, is not much effective in improving the high-temperature storage performance and the hot-oven safety performance of the lithium-ion batteries.

As can be learned from the test results of Embodiments 13-20, high-oxidation-potential solvents of different structures impose a specific impact on the performance of the lithium-ion batteries. The high-oxidation-potential solvent of a cyclic structure is characterized by a relatively high viscosity and a relatively high dielectric constant, and the high-oxidation-potential solvent of a chain structure is characterized by a relatively low viscosity and a relatively low dielectric constant. Therefore, more specifically, the high-oxidation-potential solvents include both a high-oxidation-potential solvent of a chain structure and a high-oxidation-potential solvent of a cyclic structure. In some embodiments, the high-oxidation-potential solvent includes only a high-oxidation-potential solvent of a chain structure.

As can be learned from the test results of Embodiment 4 and Embodiments 21-28, when a film-forming additive such as DTD, PS, VC, FEC, PES, ADN, and SN is further added into the nonaqueous electrolytic solution that includes the cyclic carbonate, the chain carbonate and the high-oxidation-potential solvent, the overall performance of the lithium-ion batteries is improved significantly. A possible reason is that such film-forming additives brings a film-forming effect at both the positive electrode and the negative electrode to some extent, and the formed film is stable and suppresses continuous side reactions of the nonaqueous electrolytic solution during battery use. Therefore, the increase in an impedance of the interface protective film of the positive electrode and the negative electrode is slow, and the overall performance of the lithium-ion batteries is better.

In addition, among such film-forming additives, the DTD improves the comprehensive performance of the lithium-ion batteries more significantly. A possible reason is: despite the advantages of high resistance to oxidation and non-flammability, the high-oxidation-potential solvent is hardly compatible with the negative electrode, and may give rise to side reactions at the negative electrode. The DTD can form a stable interface protective film at the negative electrode first to suppress the side reactions of the high-oxidation-potential solvent at the negative electrode. In addition, during participation in film formation of the negative electrode, the DTD can generate a lithium sulfate whose structure includes an alkoxy structure (—CH2CH2O—), thereby properly adjusting viscoelasticity of the interface protective film of the negative electrode, further improving lithium-ion interface transfer kinetics, and finally forming a thin and dense interface protective film of good lithium-ion transfer kinetics at the negative electrode. Further, the DTD may also form a stable interface protective film on a surface of the positive electrode to further improve the resistance to oxidation of the nonaqueous electrolytic solution. Therefore, after the DTD is added, the cycle life and the kinetic performance of the lithium-ion batteries are further improved, and the high-temperature storage performance and the hot-oven safety performance of the lithium-ion batteries are also improved to some extent.

Further, when the nonaqueous electrolytic solution includes both the DTD and the FEC in the film-forming additives, the performance of the lithium-ion batteries, especially the cycle performance, is even further improved. A possible reason is: the FEC can be reduced to form a stable interface protective film at the negative electrode, thereby mitigating a reduction reaction of the DTD at the negative electrode, helping further enhance film formation quality of the DTD on the surface of the positive electrode, and helping further improve the cycle performance of the lithium-ion batteries.

A person skilled in the art may make changes and modifications to the implementations of this application based on the disclosure and teachings of the specification above. Therefore, this application is not limited to the specific implementations disclosed and described above, and the modifications and changes made to this application shall also fall within the protection scope of the claims of this application. In addition, although some specific terms are used in this specification, the terms are only for ease of description and shall not constitute any limitation on this application.

What is claimed is:

1. A lithium-ion battery, comprising a positive electrode plate, a negative electrode plate, a separator, and a nonaqueous electrolytic solution, wherein the nonaqueous electrolytic solution comprises a nonaqueous solvent and a lithium salt; and the nonaqueous solvent comprises a carbonate solvent and a high-oxidation-potential solvent, the carbonate solvent is a mixture of a cyclic carbonate and a chain carbonate, and the high-oxidation-potential solvent is selected from one or more of compounds denoted by Formula I and Formula II:

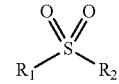

Formula I

Formula II in Formula I, $R_1$ and $R_2$ are separately selected from unsubstituted, partially halogenated, or fully halogenated alkyls that comprise 1 to 5 carbon atoms, and at least one of $R_1$ or $R_2$ is a partially halogenated or fully halogenated alkyl that comprises 1 to 5 carbon atoms;

in Formula II, $R_3$ is selected from partially halogenated or fully halogenated alkylidenes that comprise 4 to 6 carbon atoms;

a halogen atom thereof is selected from the group consisting of F, Cl, Br, and I;

the chain carbonate is selected from the group consisting of an ethyl methyl carbonate, a methyl propyl carbonate, a methyl isopropyl carbonate, a methyl butyl carbonate, an ethylene propyl carbonate, a dimethyl carbonate, a diethyl carbonate, a dipropyl carbonate, a dibutyl carbonate, or any combinations thereof;

the cyclic carbonate is selected from the group consisting of an ethylene carbonate, a propylene carbonate, or a combination thereof;

based on a total weight of the nonaqueous solvent, a weight percent content of the cyclic carbonate is 2-10%, a weight percent content of the linear carbonate is 35-65%, and a weight percent content of the high-oxidation-potential solvent is 10%-60%.

2. The lithium-ion battery according to claim 1, wherein the positive electrode plate comprises one or more of $Li_{1+x}Ni_aCo_bM'_{(1-a-b)}O_{2-c}Y_c$ and 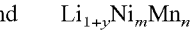
$Li_{1+y}Ni_mMn_n M''_{2-m-n}O_{4-p}Z_p$, wherein $-0.1 \le x \le 0.2$, $0.6 \le a \le 1$, $0 \le b < 1$, $0 \le (1-a-b) < 1$, $0 \le c < 1$, M' is selected from the group consisting of Mn, Al, Mg, Zn, Ga, Ba, Fe, Cr, Sn, V, Sc, Ti, Zr, and any combination thereof, and Y is selected from the group consisting of F, Cl, Br, and any combination thereof; and $-0.1 \le y \le 0.2$, $0.4 \le m \le 1.2$, $0.8 \le n \le 1.6$, $0 \le (2-m-n) \le 0.3$, $0 \le p \le 1$, M" is selected from the group consisting of Al, Mg, Zn, Ga, Ba, Fe, Cr, Sn, V, Sc, Ti, Zr, and any combination thereof, and Z is selected from the group consisting of F, Cl, and Br, and any combinations thereof.

3. The lithium-ion battery according to claim 1, wherein in Formula I, $R_1$ and $R_2$ are each independently selected from the group consisting of —CH$_3$, —CF$_3$, —CH$_2$CH$_3$, —CF$_2$CH$_3$, —CH$_2$CF$_3$, —CF$_2$CF$_3$, —CH$_2$CH$_2$CH$_3$, —CF$_2$CH$_2$CH$_3$, —CH$_2$CH$_2$CF$_3$, —CH$_2$CF$_2$CF$_3$, —CF$_2$CH$_2$CF$_3$, —CF$_2$CF$_2$CH$_3$, and —CF$_2$CF$_2$CF$_3$, and at least one of $R_1$ or $R_2$ is —CF$_3$, —CF$_2$CH$_3$, —CH$_2$CF$_3$, —CF$_2$CF$_3$, —CF$_2$CH$_2$CH$_3$, —CH₂CH₂CF₃, —CH₂CF₂CF₃, —CF₂CH₂CF₃, —CF₂CF₂CH₃, and —CF₂CF₂CF₃;

in Formula II, R₃ is selected from the group consisting of —CHFCH₂CH₂CH₂—, —CF₂CH₂CH₂CH₂—, —CF₂CH₂CH₂CHF—, —CF₂CH₂CH₂CF₂—, —CH₂CH₂CHFCH₂—, —CH₂CHFCHFCH₂—, —CH₂CH₂CH(CF₃)CH₂—, —CF₂CH₂CH₂CH₂CH₂—, —CF₂CH₂CH₂CH₂CF₂—, —CH₂CH₂CH₂CHFCH₂—, —CH₂CHFCH₂CHFCH₂—, —CH₂CHFCH₂CHFCHF—, —CH₂CH₂CH₂CH₂CHF—, —CH₂CH₂CH₂CH(CF₃)CH₂—, —CF₂CH₂CH₂CH₂CH₂CH₂—, —CH₂CH₂CH₂CHFCH₂—, —CH₂CHFCH₂CH₂CHFCH₂—, —CF₂CH₂CH₂CH₂CH₂CF₂—, —CH₂CH₂CH(CH₃)CH₂CHFCH₂—, or —CH₂CH₂CH(CF₃)CH₂CHFCH₂—.

4. The lithium-ion battery according to claim 3, wherein the high-oxidation-potential solvent is selected from the group consisting of:

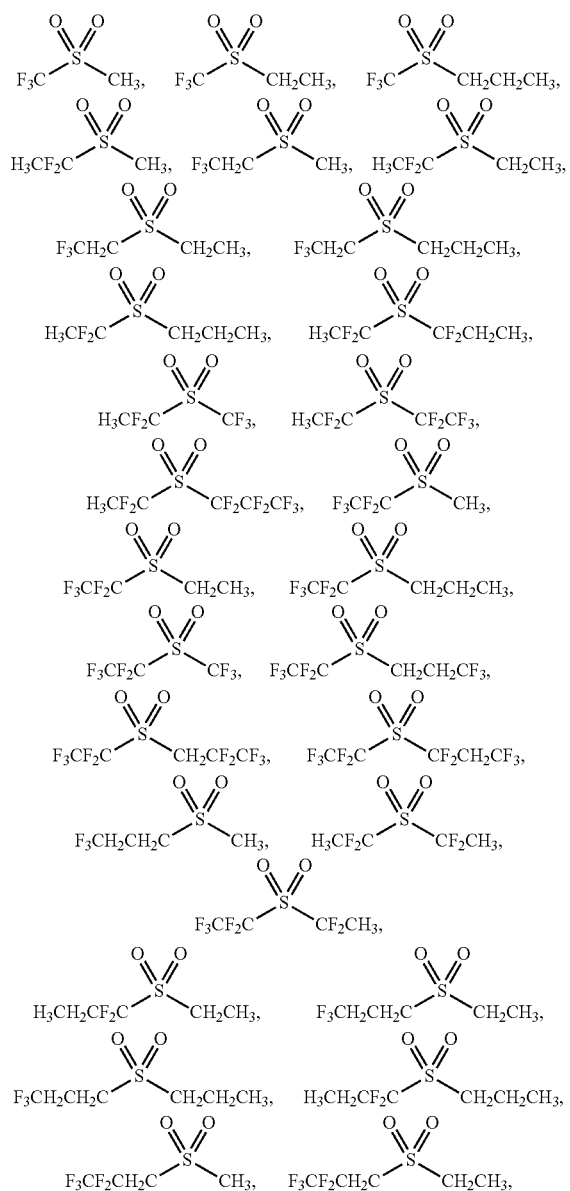

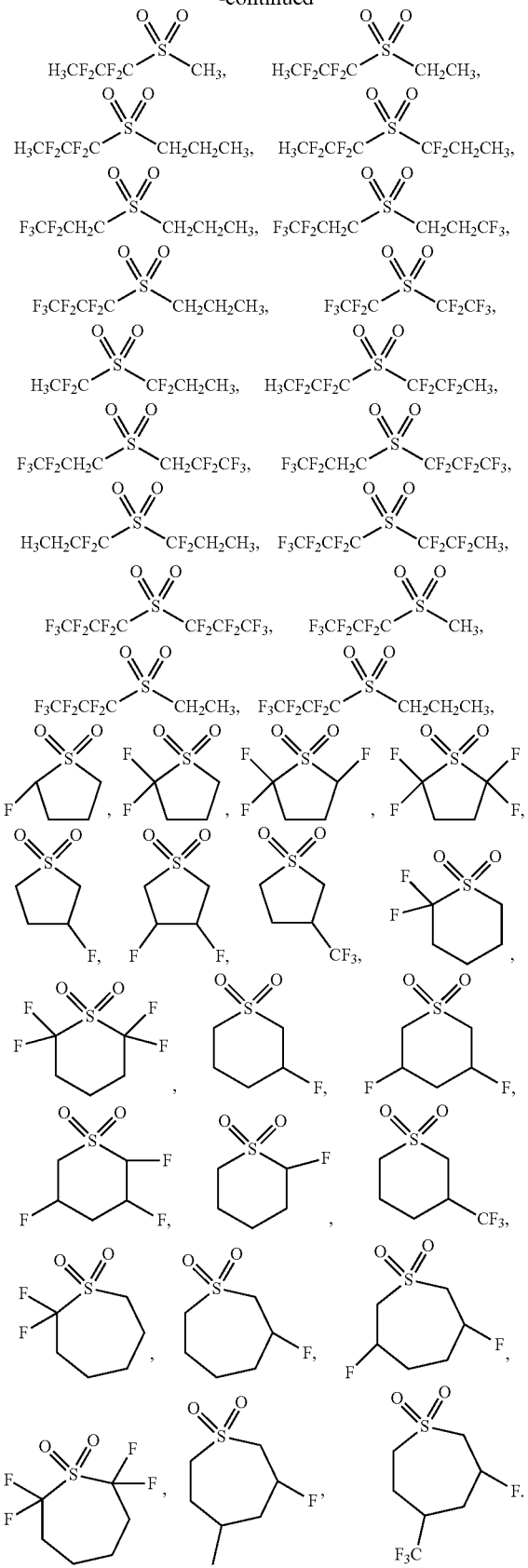

and any combinations thereof.

5. The lithium-ion battery according to claim 1, wherein, based on a total weight of the nonaqueous solvent, the weight percent content of the high-oxidation-potential solvent is 20%-40%.

6. The lithium-ion battery according to claim 1, wherein a weight ratio of the chain carbonate to the cyclic carbonate is 80:1 to 1:1.

7. The lithium-ion battery according to claim 1, wherein, based on a total weight of the nonaqueous solvent, the weight percent content of the cyclic carbonate is 3%-8%.

8. The lithium-ion battery according to claim 1, wherein the nonaqueous electrolytic solution further comprises a film-forming additive;
the film-forming additive is selected from the group consisting of a cyclic carbonate compound with an unsaturated bond, a halogenated cyclic carbonate compound, a sulfate compound, a sulfite compound, a sultone compound, a disulfonate compound, a nitrile compound, an aromatic compound, an isocyanate compound, a phosphazene compound, a cyclic anhydride compound, a phosphite compound, a phosphate compound, a borate compound, a carboxylic acid ester compound, and any combinations thereof.

9. The lithium-ion battery according to claim 8, wherein the film-forming additive comprises an ethylene sulfate and a fluoroethylene carbonate.

10. A battery module, comprising a lithium-ion battery, wherein the lithium-ion battery comprises a positive electrode plate, a negative electrode plate, a separator, and a nonaqueous electrolytic solution, and the nonaqueous electrolytic solution comprises a nonaqueous solvent and a lithium salt; and
the nonaqueous solvent comprises a carbonate solvent and a high-oxidation-potential solvent, the carbonate solvent is a mixture of a cyclic carbonate and a chain carbonate, and the high-oxidation-potential solvent is selected from one or more of compounds denoted by Formula I and Formula II:

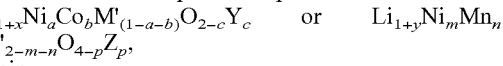

Formula I

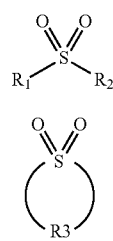

Formula II in Formula I, $R_1$ and $R_2$ are separately selected from unsubstituted, partially halogenated, or fully halogenated alkyls that comprise 1 to 5 carbon atoms, and at least one of $R_1$ or $R_2$ is a partially halogenated or fully halogenated alkyl that comprises 1 to 5 carbon atoms;
in Formula II, $R_3$ is selected from partially halogenated or fully halogenated alkylidenes that comprise 4 to 6 carbon atoms;
a halogen atom thereof is selected from the group consisting of F, Cl, Br, or I;
the chain carbonate is selected from the group consisting of an ethyl methyl carbonate, a methyl propyl carbonate, a methyl isopropyl carbonate, a methyl butyl carbonate, an ethylene propyl carbonate, a dimethyl carbonate, a diethyl carbonate, a dipropyl carbonate, a dibutyl carbonate, or any combinations thereof;
the cyclic carbonate is selected from the group consisting of an ethylene carbonate, a propylene carbonate, or a combination thereof;
based on a total weight of the nonaqueous solvent, a weight percent content of the cyclic carbonate is 2-10%, a weight percent content of the linear carbonate is 35-65%, and a weight percent content of the high-oxidation-potential solvent is 10%-60%.

11. The battery module according to claim 10, wherein the positive electrode plate comprises one or more of $Li_{1+x}Ni_aCo_bM'_{(1-a-b)}O_{2-c}Y_c$ or $Li_{1+y}Ni_mMn_nM''_{2-m-n}O_{4-p}Z_p$,
wherein
$-0.1 \leq x \leq 0.2$, $0.6 \leq a \leq 1$, $0 \leq b \leq 1$, $0 \leq (1-a-b) < 1$, $0 \leq c < 1$, M' is selected from the group consisting of Mn, Al, Mg, Zn, Ga, Ba, Fe, Cr, Sn, V, Sc, Ti, or Zr, and any combination thereof, and Y is selected from the group consisting of F, Cl, Br, and any combination thereof; and
$-0.1 \leq y \leq 0.2$, $0.4 \leq m \leq 1.2$, $0.8 \leq n \leq 1.6$, $0 \leq (2-m-n) \leq 0.3$, $0 \leq p \leq 1$, M'' is selected from the group consisting of Al, Mg, Zn, Ga, Ba, Fe, Cr, Sn, V, Sc, Ti, Zr, and any combination thereof, and Z is selected from the group consisting of F, Cl, Br, and any combinations thereof.

12. An apparatus, comprising a lithium-ion battery, wherein the lithium-ion battery is used as a power supply to the apparatus and comprises a positive electrode plate, a negative electrode plate, a separator, and a nonaqueous electrolytic solution, and the nonaqueous electrolytic solution comprises a nonaqueous solvent and a lithium salt; and
the nonaqueous solvent comprises a carbonate solvent and a high-oxidation-potential solvent, the carbonate solvent is a mixture of a cyclic carbonate and a chain carbonate, and the high-oxidation-potential solvent is selected from one or more of compounds denoted by Formula I and Formula II:

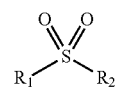

Formula I

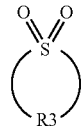

Formula II in Formula I, $R_1$ and $R_2$ are separately selected from unsubstituted, partially halogenated, or fully halogenated alkyls that comprise 1 to 5 carbon atoms, and at least one of $R_1$ or $R_2$ is a partially halogenated or fully halogenated alkyl that comprises 1 to 5 carbon atoms;
in Formula II, $R_3$ is selected from partially halogenated or fully halogenated alkylidenes that comprise 4 to 6 carbon atoms;
a halogen atom thereof is selected from the group consisting of F, Cl, Br, and I;
the chain carbonate is selected from the group consisting of an ethyl methyl carbonate, a methyl propyl carbonate, a methyl isopropyl carbonate, a methyl butyl carbonate, an ethylene propyl carbonate, a dimethyl carbonate, a diethyl carbonate, a dipropyl carbonate, a dibutyl carbonate, or any combinations thereof;
the cyclic carbonate is selected from the group consisting of an ethylene carbonate, a propylene carbonate, or a combination thereof;

based on a total weight of the nonaqueous solvent, a weight percent content of the cyclic carbonate is 2-10%, a weight percent content of the linear carbonate is 35-65%, and a weight percent content of the high-oxidation-potential solvent is 10%-60%.

13. The apparatus according to claim 12, wherein the apparatus is one selected from the group consisting of a battery electric vehicle, a hybrid electric vehicle, a plug-in hybrid electric vehicle, an electric bicycle, an electric scooter, an electric golf cart, an electric truck, an electric ship, and an energy storage system.

14. The apparatus according to claim 12, wherein the positive electrode plate comprises one or more of $Li_{1+x}Ni_aCo_bM'_{(1-a-b)}O_{2-c}Y_c$ or $Li_{1+y}Ni_mMn_nM''_{2-m-n}O_{4-p}Z_p$,
wherein
$-0.1 \leq x \leq 0.2$, $0.6 \leq a \leq 1$, $0 \leq b < 1$, $0 \leq (1-a-b) < 1$, $0 \leq c < 1$, M' is selected from the group consisting of Mn, Al, Mg, Zn, Ga, Ba, Fe, Cr, Sn, V, Sc, Ti, Zr, and any combination thereof, and Y is selected from the group consisting of F, Cl, Br, and any combination thereof; and
$-0.1 \leq y \leq 0.2$, $0.4 \leq m \leq 1.2$, $0.8 \leq n \leq 1.6$, $0 \leq (2-m-n) < 0.3$, $0 \leq p \leq 1$, M'' is selected from the group consisting of Al, Mg, Zn, Ga, Ba, Fe, Cr, Sn, V, Sc, Ti, Zr, and any combination thereof, and Z is selected from the group consisting of F, Cl, Br, and any combinations thereof.

15. The lithium-ion battery according to claim 1, wherein the high-oxidation-potential solvent comprises both of the compounds respectively denoted by Formula I and Formula II.

16. The lithium-ion battery according to claim 1, wherein the high-oxidation-potential solvent is selected from the group consisting of:

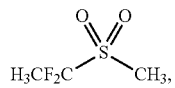 (A1)

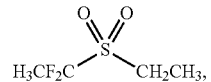 (A2)

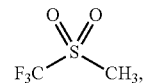 (A3)

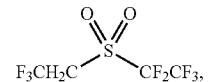 (A4)

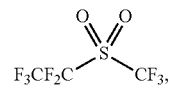 (A5)

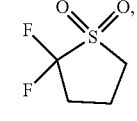 (A6)

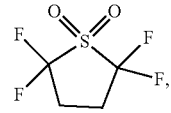 (A7)

and any combinations thereof.

17. The lithium-ion battery according to claim 6, wherein the weight ratio of the chain carbonate to the cyclic carbonate is 15:1 to 3:1.

* * * * *